Aug. 27, 1935.                M. LA LONDE                2,012,790
                              BRAKE MECHANISM
                           Filed Oct. 10, 1932
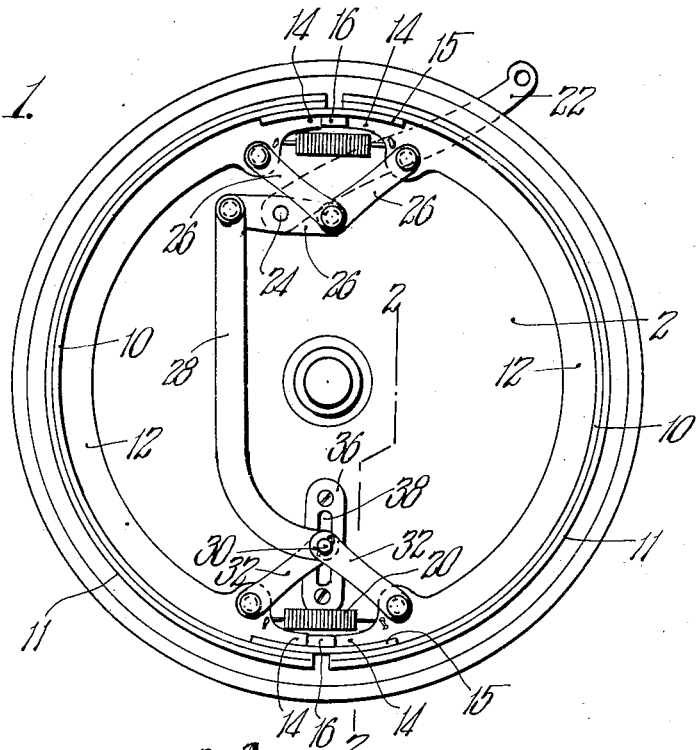
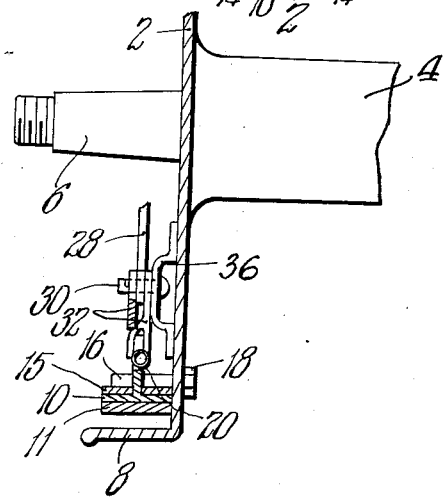
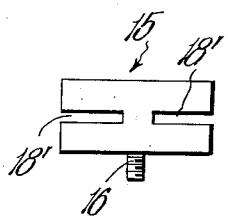
INVENTOR.
Moses LaLonde
BY
Walter C Ross
ATTORNEY.

Patented Aug. 27, 1935

2,012,790

UNITED STATES PATENT OFFICE 2,012,790

BRAKE MECHANISM

Moses La Londe, Springfield, Mass., assignor of one-fourth to Harry Bradt, one-fourth to George H. Douglass, three-eighths to Roy C. Chapin, and one-eighth to Ciriaco Sibilia Application October 10, 1932, Serial No. 637,088

3 Claims. (Cl. 188—78)

This invention relates to improvements in brake mechanism which is particularly adapted for motor vehicles of all kinds.

The principal objects of the invention are directed to the provision of brake mechanism for motor vehicles and the like which is simple in construction so as to be economical to manufacture and which is, at the same time, efficient in its operation. According to special features of the invention the mechanism includes a pair of similar braking elements which are acted upon simultaneously. The parts connecting and actuating the same are arranged so that substantially equal pressure is applied thereto whereby they operate to apply substantially equal braking pressure to a brake drum. According to further special features of the invention the connections between the shoes and actuating parts facilitate ease of operation by the avoidance of undue friction while at the same time the braking action is positive.

Various novel features and advantages of the invention will be more fully hereinafter referred to in connection with the accompanying description taken in connection with the accompanying drawing which illustrates the present preferred form of the invention.

In the drawing:

Fig. 1 is an elevational view showing the brake mechanism of the invention associated with a support.

Fig. 2 is a sectional elevational view on the line 2—2 of Fig. 1, and

Fig. 3 is an elevational view of one of the keepers, the purpose of which will hereafter more fully appear.

Referring now to the drawing more in detail the invention will be fully described.

2 represents a support for the brake mechanism of the invention which may be suitably attached to an axle construction such as an axle housing 4 as shown in Fig. 2. The axle housing 4 represents the housing at the rear end of a motor vehicle but a similar support such as represented by 2 may be suitably associated with the front axle part at the forward end of the vehicle. 6 represents an axle which carries a wheel not shown.

It will be understood that the wheel referred to will carry a brake drum of usual form that is, an annular flange with which the mechanism of the invention co-operates for the braking action.

A rim 8 is shown in association with the support and may be provided to overly the brake drum referred to. This is not necessary however for the practise of the invention.

A pair of brake shoes 10 are provided which are preferably alike and these have inwardly extending flanges 12 as shown which may be arranged to act as stiffeners. These brake shoes 10 may have affixed to their outer surfaces in some suitable manner braking material 11 for bearing against the brake drum of the wheel and may take any desired form.

Keepers 15 are carried by the support 2. These have studs 16 at the rear side thereof which are receivable in suitable openings of the support and are threaded to receive nuts such as 18.

The keepers are provided with slots 13' at opposite sides thereof which receive the opposite ends 14 of the flanges 12 of the brake shoes 10. These keepers serve to guide the ends of the brake elements when they are moved outwardly for the braking action. Springs 20 have their opposite ends suitably hooked to adjacent ends of the brake shoes and urge the brake shoes inwardly so that their ends abut the studs 16.

An operating lever 22 is carried on the outer end of a shaft 24 which is journalled in the support and a crank 26 is fixed to the inner end of the shaft 24 as shown. A pair of connectors or levers 26 have their inner ends pivotally connected to one end of the crank 26. Their outer ends are pivotally connected to the adjacent ends 14 of the brake shoes at the upper ends thereof.

A link 28 has its upper end pivotally connected to the outer end of the crank 26 while its lower end is pivotally connected by a pivot pin 30 to other connectors or levers 32. The outer ends of the levers 32 are connected to the adjacent ends of the brake shoes in a manner similar to the levers 26 previously described. A guide member 36 is carried by the support 2 and has a slot 38 therein which receives the pivot member 30.

The operation of the mechanism is as follows. For the braking action the lever 22 is moved counter-clockwise so as to swing the crank 26 counter-clockwise. As the crank 26 swings counter-clockwise the inner end is elevated so as to force the inner ends of the levers 26 upwardly which movement exerts outward pressure to the adjacent ends of the brake shoes. Also as the lever or crank 26 is swung counter-clockwise the link 28 is moved downwardly to exert pressure against the inner ends of levers 32 which like the levers 26 above force the brake shoes outwardly at their lower ends.

As will be seen the brake shoes are acted upon at their opposite ends simultaneously and are moved radially so as to force the braking surfaces thereof against a brake drum surrounding the shoes. It will be noticed that the pivotal connection 30 is guided so that it is moved in a substantially straight path for the said braking operation. By means of the mechanism it is possible to provide the braking action substantially throughout the entire surface of the brake drum and in that way the most effective braking action is effected.

By means of the pivotal connections not only is friction between the working parts reduced to a minimum and excessive wear thereon eliminated but the mechanism is reduced to a simple form. As distinguished from structures where relatively sliding parts are employed the desired braking effect is accomplished with the least possible effort.

Having described the invention in the form at present preferred what it is now desired to claim and secure by Letters Patent of the United States is:

1. Brake mechanism comprising in combination, a support, keepers thereon, brake shoes having opposite ends slidable in slots provided in said keepers, levers arranged in pairs with the outer ends thereof pivoted to adjacent ends of said shoes, an oscillatable operating crank pivotally connected at one end to the inner ends of one pair of levers, a link pivotally connected at one end to the other end of said crank, pivotal connections between the other end of said link and the inner ends of said other pair of levers and means to guide the last-named pivotal connections in a substantially straight path as pressure is applied thereto.

2. Brake mechanism comprising in combination, a support, a pair of half sector brake shoes arranged so that the ends of one shoe terminate adjacent the ends of the other, keepers slidably receiving the adjacent ends of said shoes, pairs of levers associated with the adjacent ends of said shoes, the outer ends of said levers being pivotally connected to the adjacent ends of the shoes, the inner ends of one pair of levers being pivotally connected to the inner end of a crank arranged for swinging movements relative to the support, a link pivotally connected to the outer end of said crank and pivotal connections between the other end of said link and the inner ends of the other pair of levers, means to guide the last-named pivotal connections in a substantially straight path as pressure is applied thereto.

3. Brake mechanism comprising in combination, a pair of half sector shoes arranged so that the ends of one shoe terminate adjacent the ends of the other, flanges extending inwardly of said shoes, keepers at the adjacent ends of said shoes provided with slots in which the ends of said flanges are slidable, pairs of levers associated with the adjacent ends of said shoes, the outer ends of said levers being pivotally connected to the adjacent ends of the shoes, the inner ends of one pair of levers being pivotally connected to the inner end of a crank arranged for swinging movements relative to the support, a link pivotally connected to the outer end of said crank, pivotal connections between the other end of said link and the inner ends of the other pair of levers, and springs associated with the ends of said shoes urging them towards one another.

MOSES LA LONDE.